Sept. 19, 1939.  F. M. RICHARDS  2,173,265
SIGNALING DEVICE FOR VEHICLES
Filed Nov. 15, 1935

INVENTOR
Francis M. Richards,
BY
J. Stuart Freeman
ATTORNEY

Patented Sept. 19, 1939

2,173,265

UNITED STATES PATENT OFFICE 2,173,265

SIGNALING DEVICE FOR VEHICLES

Francis M. Richards, Wynnewood, Pa.

Application November 15, 1935, Serial No. 49,903

1 Claim. (Cl. 200—59)

The object of the invention is to provide improvements in electric signaling devices, but particularly in such devices as they are applied to the operation of vehicles.

Heretofore, most devices designed to inform a driver in a following car of the intentions of the driver in a leading car, relative to whether the former intends to make a left-/or a right-hand turn, or is decreasing his speed in preparation for stopping, comprise mechanisms and/or electrical systems which commence to indicate the change in direction and/or speed only after such change has actually commenced.

Another object is therefore to provide an improved device which will visually indicate to the driver of a following car the direction which a leading driver intends to take, before actual turning of the steering wheel is begun, and thereafter automatically continues such indication as long as the wheel is turned angularly to either side of its neutral position.

A further object is to indicate to the driver of a following car the fact that the driver of a leading car intends to stop, or at least diminish the speed of his vehicle, before the leading driver actually commences to depress his brake pedal, thus giving the following driver an additional period of grace, as it were, within which to decrease the speed of his vehicle also.

Still another object is to provide a set of lights or their equivalent and an electrical system, whereby such lights are connected so as to operate individually, or in such combination as to indicate any one or combination of changes in speed and direction on the part of the leading driver.

Having in mind the principal objects thus broadly stated, the invention comprises further details of construction and operation, such as are hereinafter fully brought out in the following description, when read in conjunction with the accompanying drawing, in which Fig. 1 is a plan view of a vehicle steering wheel comprising one embodiment of the invention;

Figure 2:
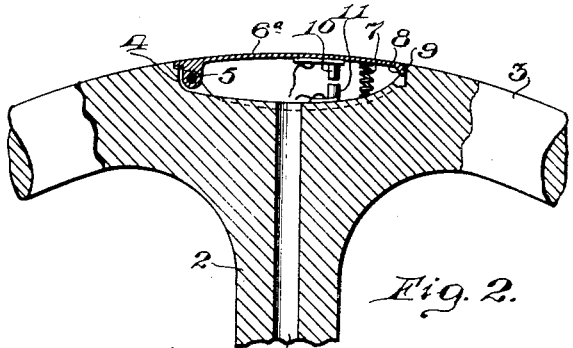
Fig. 2 is an enlarged fragmentary sectional view of a portion of said wheel, showing the internal structure of one of the two switch mechanisms.

Referring to the drawing, a steering wheel is shown as comprising a central hub portion 1 from which radiate the usual spokes 2, said spokes being connected at their outer ends by the usual rim 3. The radially outer portion of the periphery of said rim is provided with a pair of manually actuatable electric switches, and for this purpose said rim is provided with recesses 4, one of which together with its corresponding switch parts is illustrated in detail in Fig. 2. Extending transversely across one end portion of the recesses 4 is a pivot pin 5, which oscillatably supports a manually engageable switch plate 6ª (or plate 6 for the other switch), which spans the otherwise open side of said recess and normally forms a substantially unbroken continuation of the adjacent surface of the rim 3.

A spring 7 within said recess normally maintains the switch plate in its outermost or inoperative position, the outward movement of said plate being limited by the fact, that the angularly deflected edge portion 8 of said plate cooperates with and normally abuts against an overhanging shoulder, flange, or lug 9, carried by and forming an integral part of the rim 3. Said switch plate is also provided with an electric contact member 10, which, when said plate is depressed radially inwardly of the wheel against the pin of said spring, contacts with a second contact member 11 carried by the inner wall of the recess 4. From these two contact members wires lead thru channels 12 provided in the spokes 2, and emerge from said wall beneath the hub 1 and within a surrounding protective casing 13 carried by said hub, the outer surface of said hub being preferably spanned by a protective shell or plate 14.

Figure 3:
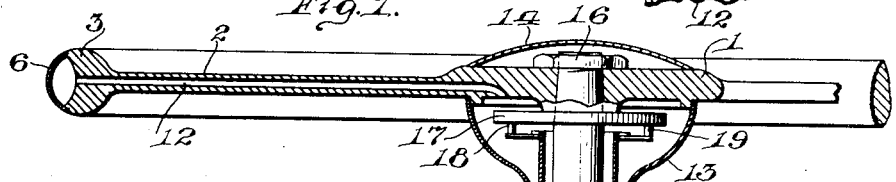
Fig. 3 is an enlarged vertically diametrical sectional view of a fragmentary portion of a wheel and the adjacent portion of its support, on the line 3—3 of Fig. 1.

The steering wheel may be mounted in the usual manner upon the shaft 15, being secured in position by means of a nut or the like 16, which is positioned beneath and protected by the protective plate 14. Preferably secured to the under surface of said hub and rotatable therewith is a disc 17 of insulating material, upon which are mounted a pair of sectional spiral commutator segments, in slidable engagement with which are contact brushes 18 and 19, in turn carried by resilient supports 20, pivotally carried at 21 by an adjacent relatively stationary part of the vehicle, which for the purpose of illustration is shown in Figs. 3 and 4, as comprising the tubular steering column 22 surrounding the shaft 15.

Figure 4:
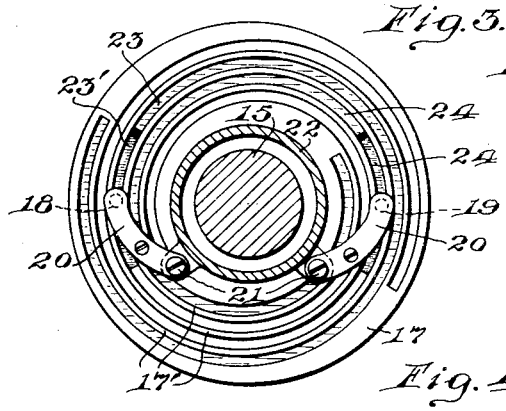
Fig. 4 is a still further enlarged view, showing the support of the steering wheel in section and the segmental and brush contacts in plan.
Figure 5:
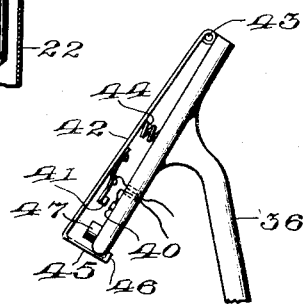
Fig. 5 is a side elevation of a brake pedal, showing the switch mounted thereon and forming a part of the invention.
Figure 6:
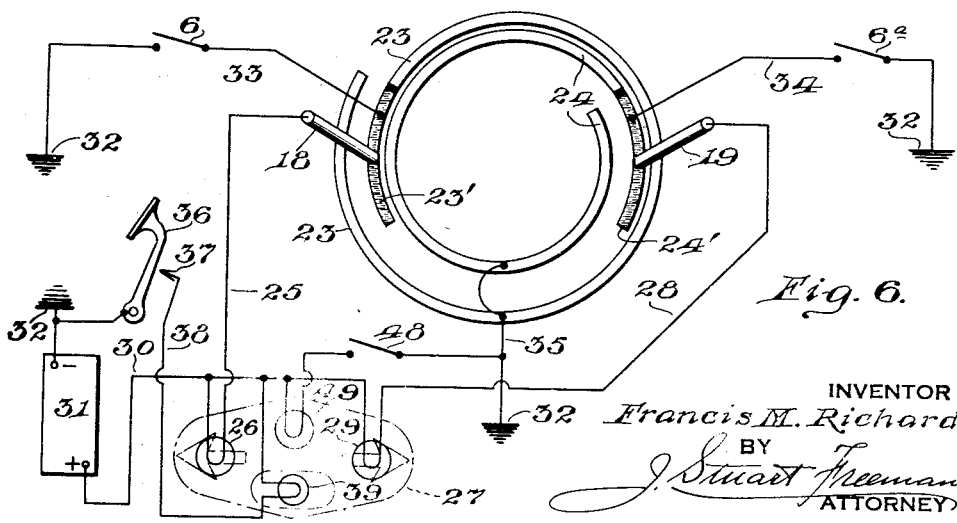
Fig. 6 is a diametrical view and wiring diagram of the entire electric signaling system of a vehicle embodying the improved steering wheel and foot pedal construction.

Referring to Figs. 4 and 6, the two spiral commutator segments comprise primary metallic members 23 and 24, each of which is shown as being of substantially 360° in extent, but may be of any desired extent circumferentially, depending upon the number of turns or part turns of which the steering wheel is capable, in the opposite directions when turning the vehicle to the left or right, as the case may be. These primary contact members 23 and 24 are preferably coaxial and spaced apart in such manner, that with spaced guide walls 17' properly positioned between said members, the contact brushes 18 and 19 will be maintained laterally only in contact with their respectively proper members, and thus be prevented from shifting laterally into contact with the adjacent member. The primary contact member 23 is insulated at one end from the auxiliary contact member 23', while the corresponding primary member 24 is similarly insulated from the auxiliary contact member 24'.

In the improved signaling system, the contact brush 18 is connected thru a wire 25 to a "left" indicating lamp 26, comprising a part of the signal lamp unit represented by the dot-and-dash line 27, and usually positioned upon the rear of a vehicle, in order to be clearly visible by the operator of a following vehicle, and in order to indicate to such operator the intentions of the operator of the leading vehicle, provided with the improved signal system, before a turn of the leading vehicle or its steering wheel is even commenced, whether the leading operator intends to turn to the left or right as the case may be, and also when he intends merely to slow and/or stop the leading vehicle, even before movement of the usual brake pedal has actually commenced to move.

Following out this system, the second brush contact 19 is connected thru a wire 28 to a "right" indicating lamp 29, both of said lamps 26 and 29 being thus connected by a common wire 30 to the usual storage battery or other source of current 31, the opposite side of said current source being connected to the ground 32. The auxiliary segment 23' is connected by a wire 33 to one of the contacts in the switch 6, the other contact of said switch being connected to said ground 32. The other of the auxiliary contact segments 24' is connected by a wire 34 to one of the contacts of the switch 6ᵃ, the other of the contacts of said last-named switch being also connected to the ground 32. Both of the primary contact segments 23 and 24 are also connected by a wire 35 to the ground 32.

Digressing from a description of the complete system for a moment, there is also included the usual foot-actuated brake pedal 36, which upon being depressed in the usual manner closes the customary "stop" indicating switch 37, which is connected thru a wire 38 to a lamp 39, the other side of said lamp being connected to the common battery wire 30. However, in this improved system the face or other suitable portion of the said brake pedal is provided with an electrical contact 40, which is adapted to cooperate with a yieldingly positioned movable contact 41, carried by an auxiliary switch plate 42, which in turn is pivotally supported at 43 by the pedal 36, and is normally maintained in spaced relation therewith by means of a spring 44.

The plate 42, preferably at its lower edge portion, is angularly directed rearwardly at 45, and thence reversely upwardly at 46, to provide a means for limiting the outward movement of said plate away from the pedal, the inward movement of said plate being arrested by engagement with a suitable stop 47, after cooperation of the contacts 40 and 41, which together comprise the "slow" indicating switch 48, shown in the system indicated in Fig. 6. This "slow" switch is also connected to the ground 32, and thru a lamp 49 to the common battery wire 30. It should also be understood at this point, that instead of a "stop" light 39 being connected to the switch 37, the position occupied by this 'stop" light may be occupied instead by the usual "tail" light, having its independent switch and connections (not shown) with the battery 31.

In the operation of this invention, it should be itially stated that from long practice it has been found, that a vehicle operator when intending to turn his vehicle to the left, involuntarily reaches forward and grips a more distant portion of the radially outer surface of the wheel, substantially the position occupied by the switch plate 6. As he thus grips the switch 6, it is obvious from the foregoing description of the signal system, that current flowing thru said switch 6 will pass thru the auxiliary segment 23', contact brush 18 and "left" indicating lamp 26, even before the slightest turn of the steering wheel towards the left hand of the operator is commenced, and certainly at the instant that he applies force thru his left hand in order to turn the steering wheel toward and thereby the vehicle itself in a left-hand direction.

With the present day construction of automobiles and similar vehicles, the relatively high ratio in the usual worm-gear, connecting the steering wheel to the pivotally mounted vehicle wheels (whether the forward or rear wheels of the vehicle), necessitates the turning of the steering wheel so far in a given direction, especially for a relatively sharp or right-angle turn in either direction, that the operator must alternately grip, release and regrip the rim of the steering wheel several times, in order to turn said wheel sufficiently far around its axis, to impart the necessary deflection to the pivotally mounted wheels of the vehicle.

Thus, after inwardly depressing the switch plate 6 and thereby lighting the lamp 26, the operator after turning the wheel slightly in a left-hand direction, will unconsciously release said switch plate and grip another portion of the wheel farther around said rim. However, with the first short turn of the wheel, and while the switch plate 6 is still being depressed, the brush contact 18 will have passed from the auxiliary segment 23' to the more elongated contact segment 23, thereby short-circuiting the switch 6 and maintaining constant flow of current thru the lamp 26, as long as the steering wheel and thereby the vehicle is proceeding in a left-hand turn.

Figure 1:
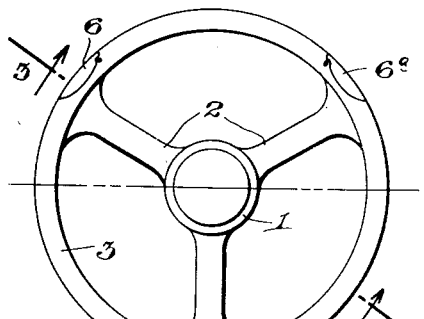

Obviously, as soon as the turn is completed, and the steering wheel has been returned to its neutral position, as shown in Fig. 1, the contact brush 18 will have again passed from engagement with the segment 23, and into contact with the auxiliary segment 23', thereby permitting the lamp 26 to be extinguished, as there will be no longer any need for the operator to continue his forward reach and engagement with the switch plate 6. Turning of the steering wheel to the right, in order to direct the vehicle in a like direction, is carried out in similar manner, manual engagement and closure of the switch contact 6ª initially lighting the lamp 29, thru co-operation of the contact brush 19 with the auxiliary segment 24', and thereafter the switch 6ª being short-circuited by and upon engagement of the contact brush 19 with the more elongated segment 24.

As is well known, an operator in approaching a relatively sharp turn usually places his foot upon the brake pedal in order to decrease the speed of the vehicle, before even beginning to make the desired turn. Therefore, it will be seen from the structure hereinbefore described, that engagement of the foot of the operator with the pedal 36 closes the switch 48, even before depression of the brake pedal 36 has commenced, thereby illuminating the lamp 49 and indicating to a following operator, that the leading operator intends to slow his vehicle, even before actual depression of the brake lever illuminates the "stop" lamp 39 by subsequent closure of the switch 37, if as before stated separate "slow" and "stop" lamps are provided, instead of a single "stop" lamp serving the duplicate purposes of indicating that the leading vehicle operator intends merely to slow and/or to bring his vehicle to a complete stop.

Having thus described my invention what I claim as new and desire to secure by Letters Patent is:

In a signal system for vehicle having left and right indicating signals, a relatively stationary member, an oscillatory member, a steering wheel, connections between the oscillatory member and steering wheel, a pair of manual switches carried by said steering wheel and accessible for left and right hand manipulation respectively, one of said members carrying a plurality of concentric nested commutator tracks insulated from each other, each track comprising a plurality of advance and main insulated sections, the other member carrying a plurality of conductor elements in electrical contact with the sections of said tracks selectively, said conductor elements being connected with said manual switches and initially in contact with said advance track sections when said wheel is in its neutral or straight-ahead position, and one of said conductor elements being moved into contact with the main section of its corresponding track when said wheel is turned from said neutral position, and connections whereby the corresponding signal is maintained as long as the last mentioned conductor element is in contact with said main track section after release of the manual switch.

FRANCIS M. RICHARDS.